US006882844B1

(12) United States Patent
Keski-Heikkiläet al.

(10) Patent No.: US 6,882,844 B1
(45) Date of Patent: Apr. 19, 2005

(54) METHOD AND SYSTEM FOR CHANGING A SUBSCRIBER PROFILE BASED ON THE IDENTITY OF A BASE STATION SERVING THE SUBSCRIBER TERMINAL

(75) Inventors: Mika Keski-Heikkilä, Helsinki (FI); Janne Linkola, Helsinki (FI); Tuomo Hokkanen, Helsinki (FI)

(73) Assignee: Sonera Oyj, Helsinki (FI)

( * ) Notice: Subject to any disclaimer, the term of this patent is extended or adjusted under 35 U.S.C. 154(b) by 470 days.

(21) Appl. No.: 09/611,827

(22) Filed: Jul. 7, 2000

(30) Foreign Application Priority Data

Jan. 9, 1998 (FI) .................................................. 980036
Jan. 8, 1999 (FI) ................................... PCT/FI99/00010

(51) Int. Cl.[7] .............................................. H04Q 7/20
(52) U.S. Cl. .................... 455/446; 455/449; 455/435.1; 455/422.1; 370/328
(58) Field of Search ................................ 455/435, 422, 455/432, 440, 443, 444, 446, 449; 370/310.2, 319–321, 328, 331; 379/201.1, 219, 242

(56) References Cited

U.S. PATENT DOCUMENTS 4,916,691 A  *  4/1990  Goodman ................... 370/389
5,295,180 A  *  3/1994  Vendetti et al. .......... 455/456.2
5,434,798 A       7/1995  Madebrink et al.
5,918,181 A  *  6/1999  Foster et al. ................. 455/456
6,058,308 A  *  5/2000  Kallin et al. ................. 455/432
6,212,384 B1 *  4/2001  Almgren et al. ............ 455/446

FOREIGN PATENT DOCUMENTS

EP      0 597 638 A1    5/1994
EP        597638 A1  *  5/1994   ............ H04Q/7/22
WO      WO 97/11569     3/1999

* cited by examiner

Primary Examiner—William Trost
Assistant Examiner—Stephen D'Agosta
(74) Attorney, Agent, or Firm—Cohen, Pontani, Lieberman & Pavane

(57) ABSTRACT

A method and system for changing a subscriber profile on the basis of the detected or known identity of the base station currently serving the terminal equipment of that subscriber in a mobile communication network. A permanent and unique identity parameter or designation is created and assigned to each base station of the network, and is broadcast by each respective base station to all subscriber terminal equipment currently in its communication coverage area or region. Changing of the subscriber profile on the basis of subscriber movements within the network is accomplished with enhanced flexibly and ease and at lower cost than heretofore possible.

7 Claims, 2 Drawing Sheets

METHOD AND SYSTEM FOR CHANGING A SUBSCRIBER PROFILE BASED ON THE IDENTITY OF A BASE STATION SERVING THE SUBSCRIBER TERMINAL

BACKGROUND OF THE INVENTION

1. Field of the Invention

The present invention relates to a method and system for changing a subscriber profile on the basis of the identity of the particular base station currently serving the subscriber's terminal equipment in a mobile communication network.

2. Description of Related Art

It is expected that, in the near future, a growing demand will develop for various applications and services that require identification of the particular base station currently serving a subscriber's terminal equipment in mobile communication networks. The profile of a travelling or moving subscriber can be modified, as for example by limiting or extending services or changing available applications or their operation or features, as a function of the network cell in whose area the subscriber is currently located. One current example of this need is in home cell pricing policy, in accordance with which the charges for a subscriber's calls are calculated at a reduced rate when the subscriber's terminal equipment is located within the so-called home cell area or region.

In current mobile communication systems, however, it is difficult to implement such changes in the subscriber profile on the basis of base station identity, primarily because base stations do not have a permanent identity, i.e. one that is consistent for a period of months or years. The CGI (Cell Global Identity) information that is currently transmitted in the BCCH (Broadcast Control Channel) channel of a mobile communication network contains by way of example a cell identifier, but in network reconfigurations it is not uncommon that the cell identifiers must be changed. Some such changes apply to only a single base station at a time, so that applications and services could be designed to utilize the identifiers of a plurality of base stations, in which case changing the identifier of one of the base stations would not necessarily confuse the application or render it unusable. Other changes, such as Base Station Controller (BSC) switch-overs, simultaneously apply to and affect a large number of base stations, so that the aforementioned technique of monitoring a plurality of base stations for identification changes cannot be effectively or practically utilized. In short, designing and constructing a system for changing the subscriber profile on the basis of base station identity is at present either impossible or, at the very least, impractically expensive.

OBJECTS AND SUMMARY OF THE INVENTION

It is accordingly the desideratum of the present invention to provide a method and system operable for eliminating, or at least greatly diminishing, the drawbacks and deficiencies of the prior art as for example hereinabove described.

It is a specific object of the invention to provide a method for changing a subscriber profile on the basis of the identity of the base station currently serving the subscriber's terminal equipment in a mobile communication network.

It is a further object of the invention to provide a system for changing the subscriber profile on the basis of the identity of the base station currently serving the subscriber's terminal equipment in a mobile communication network.

In accordance with the inventive method for changing a subscriber profile on the basis of the identity of the base station currently serving the subscriber's terminal equipment in a mobile communication network, information signals are sent by each base station and received by the terminal equipment of each subscriber, each of which terminal equipment typically comprises a mobile station provided with or including a subscriber identity module (SIM). The information signals sent by each base station include a permanent base station identity designation, and changes to each subscriber profile are made on the basis of the permanent identity designation of the base station currently serving that subscriber's terminal equipment, as received by that terminal equipment from the base station in whose communication service area the terminal equipment is currently located.

As compared with prior art, the present invention advantageously provides a more stable, extra or additional identity designation that is created for and assigned to each base station, this additional identity being transmitted by the base station to all of the subscriber terminal devices currently in its area or region of communication coverage. Thus, each terminal device is at all times kept informed as to the particular base station in whose area it is currently located. That base station identity designation is not changed in conjunction with network reconfiguration, as in prior art systems and methods. As a consequence, changing of a subscriber profile on the basis of the subscriber's movements is accomplished with enhanced flexibility, with considerably more ease, and at substantially lower cost than heretofore possible.

In embodiments of the inventive method, information signals may be transmitted in the cell broadcast channel (CBCH) or in any other suitable channel of the communication network, and the mobile communication network may be based on digital technology such, for example, as GSM (Global System for Mobile communications) technology or DCS1800 technology or the like.

The inventive system for changing a subscriber profile on the basis of the identity of the base station currently serving the subscriber's terminal equipment in a mobile communication network comprises a base station which is operative for transmitting information signals, and terminal equipment typically implemented by a mobile station provided, with a subscriber identity module and which receives the information signals transmitted by the base station. The base station, or the inventive system, further comprises means for inserting or including in the transmitted information signals a permanent base station identity designation or identifier unique to and associated with that base station. In addition, the terminal equipment includes means for changing the subscriber profile on the basis of the received permanent identity designator of the particular base station currently serving that terminal equipment.

In embodiments of the inventive system, the information signals may be transmitted in the cell broadcast channel (CBCH) or in any other suitable channel of the communication network, and the mobile communication network may be based on digital technology such, for example, as GSM technology or DCS1800 technology or the like.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements through the several figures.

DETAILED DESCRIPTION OF THE CURRENTLY PREFERRED EMBODIMENTS

Figure 1A:
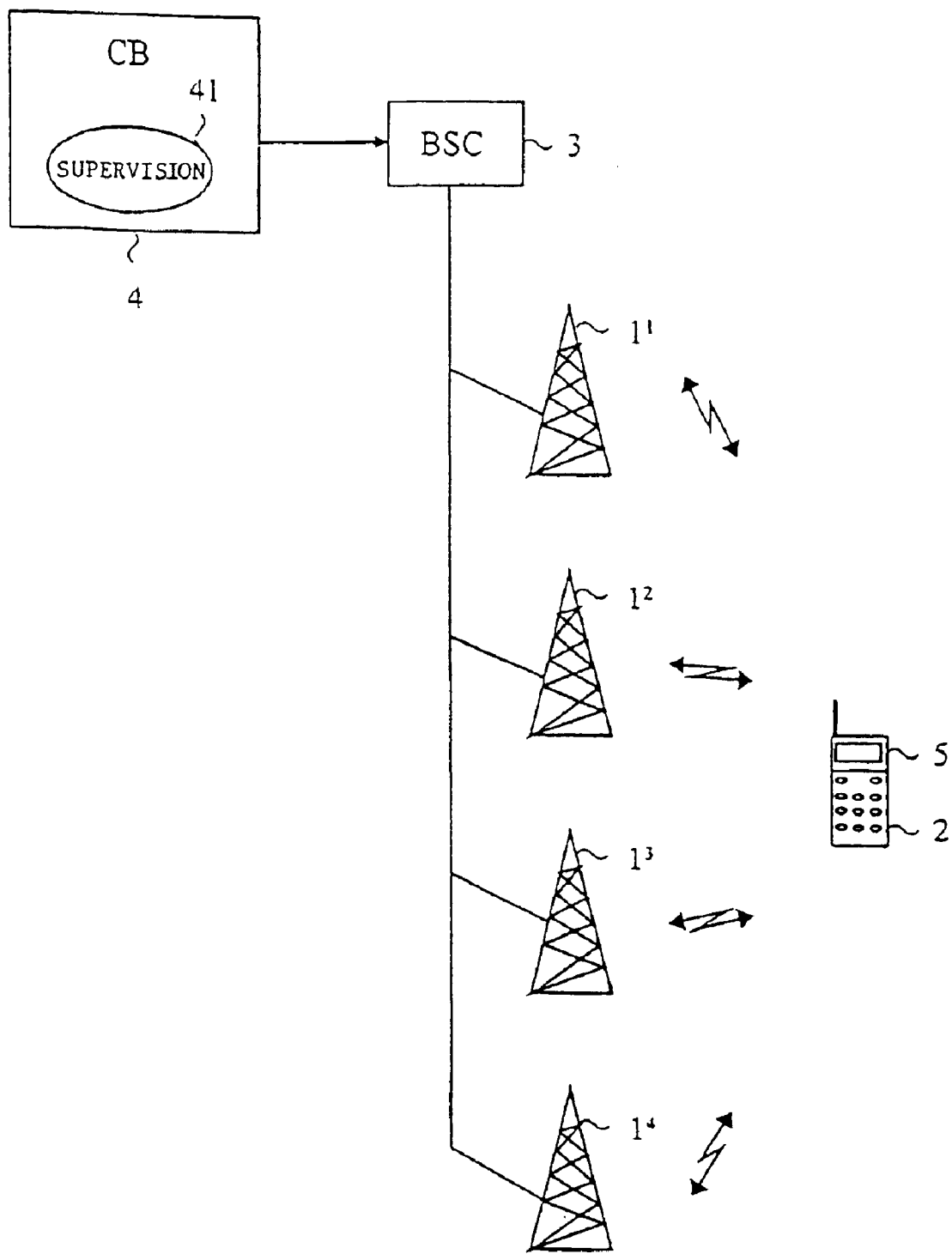
FIG. 1a schematically depicts a system in accordance with the present invention.

FIG. 1a depicts a mobile communication system, based in this particular embodiment on GSM (Global System for Mobile communications) technology, that includes by way of illustration four base stations $1^1$, $1^2$, $1^3$ and $1^4$. The base stations are connected to a base station controller (BSC) 3, which is in turn connected to a cell broadcast (CB) server 4. The cell broadcast server 4 includes or implements supervision software 41 that is used to create or assign, in accordance with the present invention, an extra or additional identity of a permanent nature for each of the base stations $1^1$, $1^2$, $1^3$ and $1^4$. In practice, this additional assigned identity may take the form, by way of nonlimiting example, of a sequence number or the like. The supervision software 41 and base station controller 3 are operable and configured to assure that the permanent identity thus assigned to each base station $1^1$, $1^2$, $1^3$ and $1^4$ is included in the information signal that is transmitted by the base station to all mobile equipment located in its communication coverage area or region. The supervision software 41 and base station controller 3 are further operatively responsible for continuing to maintain or preserve the same identity for each base station, even through and after changes are made in the network. The base stations $1^1$, $1^2$, $1^3$ and $1^4$ may, by way of currently preferred example, transmit the information signals in the cell broadcast channel (CBCH) or, alternatively, in any other suitable channel of the communication network.

Also depicted in FIG. 1a is a terminal or terminal equipment 2. As should be apparent, the system may include an almost unlimited number of such terminals, although only a single terminal 2 is shown by way of illustrative example and for ease of description. The terminal equipment typically takes the form of a mobile station that includes or is provided with a subscriber identity module (SIM). The terminal equipment 2 further includes means 5 for changing the subscriber profile on the basis of the identity of the particular base station that is currently serving that terminal, as received by the terminal from the base station. The means 5 may for example comprise software implemented in the subscriber identity module and/or a separate or separable or integrated device connected to the mobile station, and is additionally operable for receiving the information signal and, with it, the permanent identity designation of the base station currently serving the terminal equipment. Changes in the subscriber profile are then made on the basis of the received or known permanent identity designation of the base station in whose communication coverage area or region the terminal is currently located. A change in subscriber profile may comprise, for example, a decrease in the applicable call charges where the subscriber remains within the predetermined home cell(s) calling area or region.

Figure 1B:
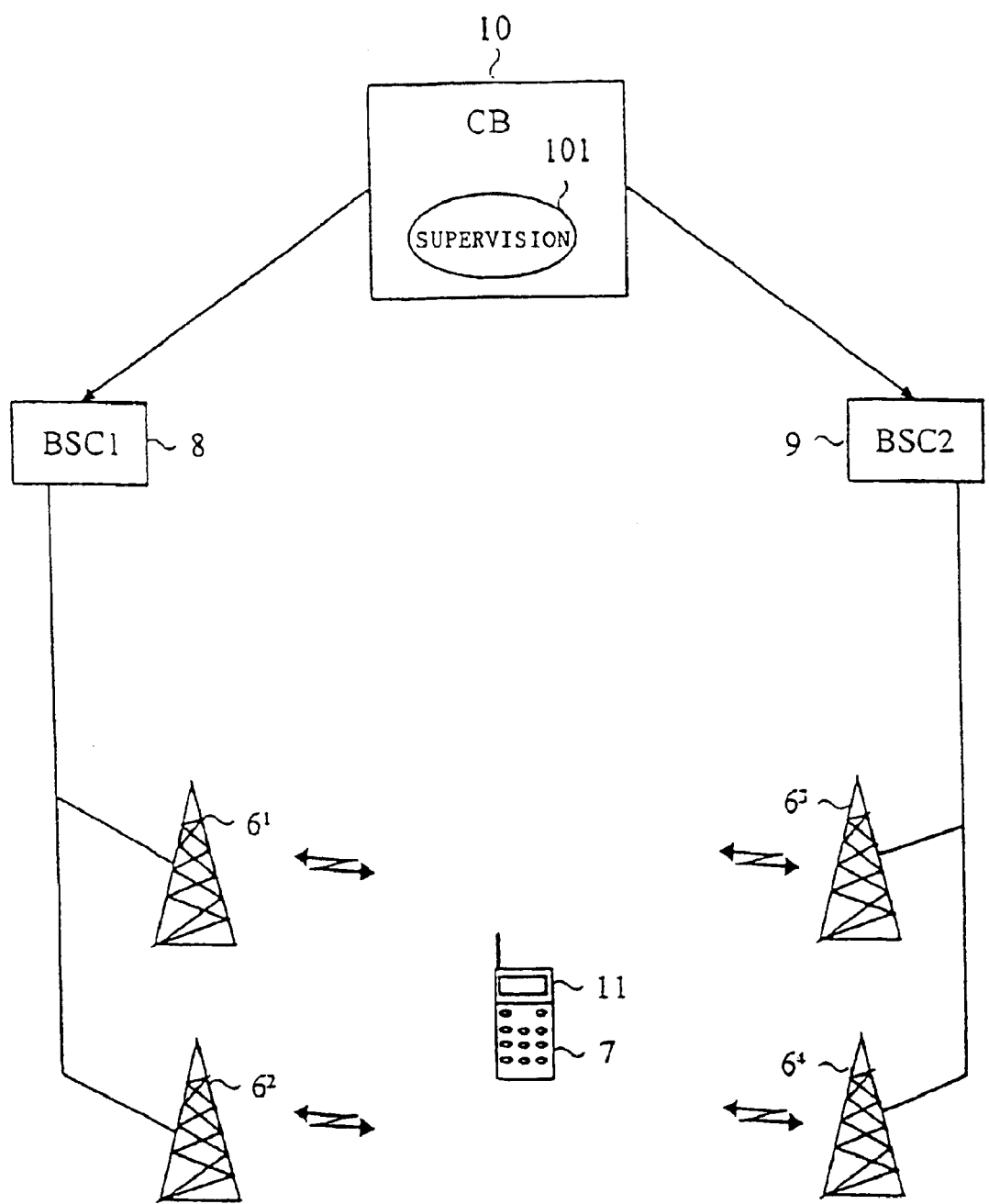
FIG. 1b schematically depicts another system in accordance with the invention.

FIG. 1b depicts a system generally corresponding to that shown in FIG. 1a but following a BSC switch-over, a network reconfiguration procedure commonly used in mobile communication systems. In the FIG. 1b illustrated arrangement after BSC switch-over, base stations $6^1$, $6^2$, $6^3$ and $6^4$ (which were originally controlled by a single base station controller) are now allotted to and among the several base station controllers 8, 9. In prior art implementations, such a reconfiguration introduces changes in the base station identities. In accordance with the present invention, on the other hand, the identification parameter of each base station remains the same, under the supervision and control of the supervision software 101 implemented in cell broadcast server 10 and the base station controllers 8 and 9. As in the FIG. 1a system, the terminal equipment 7 of FIG. 1b includes means 11 for changing the subscriber profile on the basis of the identity of the mobile station currently serving the terminal equipment.

Thus, while there have shown and described and pointed out fundamental novel features of the invention as applied to preferred embodiments thereof, it will be understood that various omissions and substitutions and changes in the form and details of the methods and devices described and illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for changing a subscriber profile of a subscriber to a mobile communication network based on an identity of a base station currently serving a terminal equipment of the subscriber in the mobile communication network, the terminal equipment comprising a mobile station having a subscriber identity module, comprising the steps of:

creating, by a server including supervision software, a permanent base station identity designation and assigning the permanent base station identity designation to the base station for uniquely identifying the base station independent of mobile communication network configuration changes, wherein the permanent base station identity designation is separate from a cell identity of a global cell identifier of the base station;

transmitting, from the base station to the terminal equipment, an information signal for receipt by the terminal equipment when the terminal equipment is in an area served by the base station, the information signal comprising the permanent base station identity designation in addition to the cell identity of the global cell identifier, wherein the information signal is transmitted from the base station to the terminal equipment in a cell broadcast channel of the mobile communication network; and changing, by the terminal equipment, the subscriber profile based on the permanent base station identity designation received by the terminal equipment of the subscriber from the base station, whereby the step of changing the subscriber profile is a function of the terminal equipment that does not require an update in response to a network reconfiguration changing the cell identity of the global cell identifier.

2. The method of claim 1, wherein the mobile communication network comprises a digital mobile communication network.

3. The method of claim 2, wherein the mobile communication network comprises a GSM network.

4. The method of claim 1, wherein the base station has a cell global identifier and the permanent base station identity designation is in addition to the cell global identifier.

5. A system for changing a subscriber profile of a subscriber to a mobile communication network based on an identity of a base station currently serving a terminal equipment of the subscriber in the mobile communication network, the terminal equipment comprising a mobile station having a subscriber identity module and the base station being operable for transmitting an information signal for receipt by the terminal equipment when the terminal equipment is in a communication coverage area served by the base station, the improvement comprising:

a server including supervision software operatively arranged for creating a permanent base station identity designation and assigning the permanent base station identity designation to the base station for uniquely identifying the base station independent of mobile communication network configuration changes, wherein the permanent base station identity designation is separate from a cell identity of a global cell identifier of the base station;

means for including in the information signal transmitted by the base station the permanent base station identity designation in addition to the cell identity of the global cell identifier, wherein the information signal is transmitted from the base station to the terminal equipment in a cell broadcast channel; and means in the terminal equipment for changing the subscriber profile based on the permanent base station identity designation received by the terminal equipment of the subscriber from the base station, whereby said means for changing the subscriber profile provides a function of the terminal equipment that does not require an update in response to a network reconfiguration changing the cell identity of the global cell identifier.

6. The system of claim 5, wherein the mobile communication network comprises a digital mobile communication network.

7. The system of claim 6, where the mobile communication network comprises a GSM network.

\* \* \* \* \*